2,854,423

ALUMINUM RESINATE RUBBER COMPOSITION AND METHOD OF MAKING THE SAME

Gilbert H. Swart, Akron, and Paul J. Earley, Cuyahoga Falls, Ohio, assignors to The General Tire and Rubber Company, Akron, Ohio, a corporation of Ohio No Drawing. Application May 27, 1954
Serial No. 432,924

4 Claims. (Cl. 260—27)

This invention relates to rubber compounds and particularly such compounds suitable for preparing shoe soles, tile, and articles having higher than usual hardness without the undesirable effects of high pigment loadings. The compounds are intimate mixtures of a rubbery polymer such as natural rubber and other polymers of conjugated diolefinic compounds of less than eight aliphatic carbons, such as butadiene, isoprene, dimethylbutadiene chloroprene, etc. or copolymers of one or more such diolefinic compounds with a mono-olefinic compound copolymerizable therewith such as styrene, alpha methylstyrene, methyl styrene (vinyl toluene) and other nuclearly substituted styrenes, methyl isopropenyl ketone, vinyl pyridine, methacrylic and acrylic esters and the like, with certain aluminum resinates. Hydrocarbon compatible rubbers are preferred to oil resistant rubbers such as the so-called N rubbers which contain substantial amounts of acrylo or methacrylo nitrile.

It has been found that certain aluminum resinates when compounded with rubbers such as above referred to in substantial amounts provide compositions having unique and advantageous physical characteristics. Proper amounts of the aluminum resinates combined with rubber compositions of high Mooney viscosity serve to improve the workability of the composition. The aluminum resinates also increase strength and abrasion resistance of rubber compositions and, when present in sufficient quantity, have a stiffening effect similar to that of pigments.

It is believed that the aluminum resinate is soluble to a limited extent in rubber, which accounts for its softening effect in high Mooney viscosity rubbers and that part of the aluminum resinate is not dissolved and acts in much the same way as a reinforcing pigment. The dissolved portion of the aluminum resinate may form a gel structure within the rubber which serves to strengthen the composition and which may be compared to the gel structures formed by aluminum salts of fatty acids in gasoline in making the well known "gellied gasoline."

The composition of the present invention is formed by coagulating a latex containing water soluble rosin soap in an aqueous coagulating bath which contains aluminum sulfate, $Al_2(SO_4)_3$ in solution. Other soluble aluminum salts of inorganic acids may, however, be employed, but aluminum sulfate is preferred. The quantities of rosin and alum employed are regulated to provide the desired proportion of aluminum resinate in the coagulated product. It has been found that compounds containing 20 parts or more of aluminum resinate to 100 parts of the polymer have desirable physical characteristics attributable to the aluminum resinate. It is usually preferable, however, to provide from 50 to 100 parts of aluminum resinate to 100 parts of the polymer. Where a stiff composition comparable to one heavily loaded with pigment is desired, as much as 200 parts of aluminum resinate to 100 parts of polymer may be employed.

In coagulating latices containing rosin soaps to produce the composition of the present invention it is desirable to convert as much of the rosin content of the latex into aluminum resinate during coagulation as possible. In order to insure the maximum production of aluminum resinate during coagulation, substantially all of the rosin content of the latex should be in the form of water soluble salts of the rosin acids such as sodium salts and to insure this result the pH of the latex should be from 10.5 to 11. Suitable amounts of a caustic alkali such as sodium hydroxide may be added to adjust the pH of the latex. It is also desirable to provide an amount of aluminum sulfate in the coagulating bath such that the pH of the coagulating solution is not less than 3.2 to 3.4 at the beginning of the coagulating operation and does not rise to above 3.8 to 4.0 before the completion of the operation. It has been found that the conditions of coagulation of a rosin soap-latex mixture determine the character of the aluminum resinate produced. Too much aluminum sulfate or chloride may, instead of increasing aluminum content, cause too much acidity, with consequent formation of rosin, and too little aluminum salt may also provide a resinate low in aluminum and without the desirable properties of that used in accordance with the present invention. If it is desirable to employ an aluminum sulfate solution of a concentration such that the initial pH would be materially less than 3.2 a small amount of sodium hydroxide may be added to the coagulating bath to bring it up to the desired pH.

By determining the amount of a given latex that can be coagulated in a given volume of coagulating solution of the proper concentration without effecting more than the permissible change in the hydrogen ion concentration, an aluminum sulfate bath of the proper volume and concentration may be provided for any given volume of latex to be coagulated. It has been found that the amount of aluminum sulfate should be from two-thirds to twice the stoichiometric amount for the aluminum diresinate formed by the reaction, assuming its structure to be

By regulating the amount of aluminum sulfate employed in the coagulating bath, by providing the proper hydrogen ion concentration in the latex and by maintaining the proper hydrogen ion concentration during coagulation as above described, an aluminum resinate rubber composition is obtained in which the major portion of the rosin content of the latex has been converted into aluminum resinate and in which the free rosin content is not sufficient to be harmful.

To study the effect of hydrogen ion concentration in the coagulating bath on the product, a series of coagulations were run in which the product was removed from the coagulant in thirds and each third was cured and evaluated for physical properties. In each of these runs FF wood rosin was used and the proportion of approximately 100 parts resinate to 100 parts GRS of about 140 Mooney viscosity was maintained.

In Example 1 the initial concentration of the aluminum sulfate provided an initial pH of 2.6 and a pH of 3.4 for the second and third thirds. In Examples 2 and 3 the pH of the coagulating solution was increased by increasing the volume of water. In Examples 3 and 4 the initial pH was raised by adding sodium hydroxide.

Example No. 1

|  | 1st third | 2nd third | last third |
|---|---|---|---|
| pH initial | 2.6 | 3.4 | 3.4 |
| pH final | 3.4 | 3.4 | 3.4 |

[Coagulant: 154 g. Al₂(SO₄)₃—18 H₂O in 500 g. water. 200 g. resinate master in each ⅓.]

| Cure @ 320° | 10′ | 20′ | 30′ | 10′ | 20′ | 30′ | 10′ | 20′ | 30′ |
|---|---|---|---|---|---|---|---|---|---|
| 300% Modulus | 515 | 685 | 715 | 795 | 820 | 838 | 810 | 820 | 890 |
| Tensile | 2,315 | 2,370 | 2,285 | 2,225 | 2,080 | 2,055 | 2,270 | 2,220 | 2,080 |
| Elongation, percent | 675 | 610 | 600 | 585 | 575 | 565 | 590 | 575 | 570 |
| Durometer A | 85 | 87 | 89 | 98 | 98 | 99 | 97 | 97 | 99 |
| Durometer D | 30 | 31 | 31 | 41 | 42 | 43 | 41 | 42 | 42 |

Example No. 1 shows that the rubber made from the material formed when the pH is 3.0 or lower is considerably softer than that made from the material formed when the pH is between 3.4 and 3.8.

Example No. 2

|  | 1st third | 2nd third | last third |
|---|---|---|---|
| pH initial | 3.1 | 3.4 | 3.7 |
| pH final | 3.4 | 3.7 | 3.5 |

[Coagulant: 154 g. Al₂(SO₄)₃—18H₂O in 5,000 g. water. 200 g. resinate master in each ⅓.]

| Cure @ 320° | 10′ | 20′ | 30′ | 10′ | 20′ | 30′ | 10′ | 20′ | 30′ |
|---|---|---|---|---|---|---|---|---|---|
| 300% Modulus | 743 | 810 | 820 | 890 | 860 | 985 | 915 | 915 | 920 |
| Tensile | 2,315 | 2,125 | 2,270 | 2,245 | 2,255 | 2,060 | 2,170 | 2,280 | 1,945 |
| Elongation, percent | 610 | 600 | 585 | 575 | 560 | 525 | 535 | 560 | 510 |
| Durometer A | 96 | 98 | 98 | 97 | 97 | 99 | 97 | 98 | 99 |
| Durometer B | 38 | 39 | 39 | 41 | 41 | 43 | 42 | 42 | 43 |

Example No. 2 shows that the hardness of the rubber formed from the initially coagulated material may be increased by diluting the coagulant to raise the pH.

Example No. 3

|  | 1st third | 2nd third | last third |
|---|---|---|---|
| pH initial | 3.6 | 3.8 | 3.8 |
| pH final | 3.8 | 3.8 | 3.8 |

[Coagulant: 154 g. Al₂(SO₄)₃—18 H₂O in 5,000 g. water; pH adjusted to 3.6 (10 g. 50% NaOH) 200 g. resinate master in each ⅓.]

| Cure @ 320° | 10′ | 20′ | 30′ | 10′ | 20′ | 30′ | 10′ | 20′ | 30′ |
|---|---|---|---|---|---|---|---|---|---|
| 300% Modulus | 925 | 945 | 952 | 915 | 915 | 965 | 920 | 910 | 912 |
| Tensile | 2,200 | 2,025 | 2,025 | 2,110 | 2,170 | 2,090 | 2,220 | 2,010 | 2,185 |
| Elongation, percent | 565 | 545 | 540 | 540 | 550 | 540 | 550 | 530 | 560 |
| Durometer A | 98 | 98 | 98 | 97 | 98 | 99 | 97 | 98 | 98 |
| Durometer B | 42 | 42 | 42 | 42 | 42 | 44 | 42 | 42 | 42 |

Example No. 3 shows that the hardness of the rubber produced from the initially coagulated material may be further increased by the addition of a small quantity of sodium hydroxide to the dilute coagulating solution.

Example No. 4

|  | 1st third | 2nd third | last third |
|---|---|---|---|
| pH initial | 3.2 | 3.7 | 3.8 |
| pH final | 3.7 | 3.8 | 3.7 |

[Coagulant: 154 g. Al₂(SO₄)₃—18 H₂O in 500 g. water with pH adjusted to 3.2 with 5 g. 50% NaOH. 200 g. resinate master in each ⅓.]

| Cure @ 320° | 10′ | 20′ | 30′ | 10′ | 20′ | 30′ | 10′ | 20′ | 30′ |
|---|---|---|---|---|---|---|---|---|---|
| 300% Modulus | 860 | 865 | 890 | 825 | 818 | 840 | 848 | 815 | 865 |
| Tensile | 2,200 | 2,390 | 1,945 | 2,130 | 2,030 | 1,940 | 2,410 | 2,178 | 2,138 |
| Elongation, percent | 560 | 580 | 550 | 590 | 560 | 550 | 595 | 565 | 560 |
| Durometer A | 96 | 97 | 97 | 96 | 96 | 97 | 96 | 96 | 96 |
| Durometer D | 43 | 45 | 45 | 44 | 44 | 45 | 44 | 45 | 45 |

Example No. 4 shows that a similar result can be obtained by addition of sodium hydroxide to the more concentrated coagulating solution.

For evaluating various aluminum resinate reinforced rubbers, a series of masterbatches which contained various amounts of resinate to 100 parts of high Mooney butadiene styrene copolymer were made, some of which contained decreased amounts of aluminum resinate down to 25 parts and others of which had increased amounts of resinate.

Example No. 5

| Cure @ 320° | P 50% resinate | | | Q 45% resinate | | |
|---|---|---|---|---|---|---|
| | 10' | 20' | 30' | 10' | 20' | 30' |
| 300% Modulus | 800 | 800 | 840 | 700 | 762 | 775 |
| Tensile | 2,060 | 2,030 | 1,910 | 2,142 | 1,985 | 1,715 |
| Elongation, percent | 550 | 555 | 570 | 555 | 530 | 530 |
| Durometer A | 96 | 96 | 96 | 92 | 92 | 94 |
| Durometer D | 43 | 44 | 44 | 35 | 35 | 37 |

| | R 35% resinate | | | S 25% resinate | | |
|---|---|---|---|---|---|---|
| 300% Modulus | 554 | 610 | 556 | 437 | 420 | 420 |
| Tensile | 1,790 | 1,670 | 1,590 | 1,370 | 1,388 | 1,340 |
| Elongation, percent | 570 | 550 | 550 | 565 | 560 | 550 |
| Durometer A | 82 | 83 | 84 | 65 | 66 | 67 |
| Durometer D | 25 | 25 | 26 | 21 | 21 | 21 |

Coagulant 77 g. Al₂(SO₄)₃—18 H₂O in 2,500 g. water. pH adjusted to 3.7 initially. 300 g. dry resinate master in "P"; in subsequent batches Q, R, and S the resinate content is reduced to the amounts indicated by adding the necessary amount of rubber latex to a soap latex mixture like the one used to make batch P. Extra alum was necessary to completely coagulate batches R and S.

Example No. 5 shows the physical properties of cured aluminum resinate rubber compositions containing 50%, 45%, 35% and 25% aluminum resinate, respectively.

Example No. 6

| | | | |
|---|---|---|---|
| Na soap of FF wood rosin (21% TS) | 1,600 | 2,133 | 2,633 |
| XPRD 211 latex (24% TS) | 1,390 | 1,390 | 1,390 |
| Santowhite (10% TS) | 67 | 67 | 67 |
| Dilution | 3× | 3× | 3× |
| Coagulant Al₂(SO₄)₃ | 200 | 266 | 334 |
| Parts resinate 100 or rubber | 100 | 133 | 167 |

| Cure @ 320° | 10' | 20' | 30' | 10' | 20' | 30' | 10' | 20' | 30' |
|---|---|---|---|---|---|---|---|---|---|
| Modulus | 1,070 | 1,160 | 1,085 | 1,370 | 1,370 | 1,385 | 1,070 | 1,225 | 1,365 |
| Tensile | 2,610 | 2,560 | 2,320 | 2,265 | 2,235 | 2,310 | 1,940 | 2,025 | 1,940 |
| Elongation, percent | 575 | 570 | 555 | 510 | 515 | 495 | 535 | 495 | 525 |
| Durometer D | 43 | 43 | 44 | 50 | 50 | 51 | 56 | 56 | 56 |

Example No. 6 shows the physical characteristics of cured aluminum resinate rubber compositions containing 100, 133 and 167 parts respectively of aluminum resinate per hundred parts of rubber.

Shoe soling stocks of aluminum resinate rubber that compare favorably with high grade soling stocks reinforced with high styrene resin can be made at a cost considerably less than that of high styrene resin soling stocks.

Example No. 7

| | |
|---|---|
| Al resinate master (100–100) | 150 |
| GRS | 25 |
| Hard clay | 100 |
| ZnO | 10 |
| Stearex | 2 |
| Altax | 2 |
| Guantal | 0.5 |
| Silene | 10 |
| S | 3 |
| Agerite white | 1 |
| Red oxide | 1 |
| Titanox | 3 |

The above compound, when cured for the times indicated, showed the following properties:

| Cure (Minutes at 320° F.) | 10' | 20' | 30' |
|---|---|---|---|
| 300% Modulus | 1,380 | 1,605 | 1,650 |
| Tensile (p. s. i.) | 1,525 | 1,845 | 1,750 |
| Elongation, percent | 370 | 395 | 320 |
| Tear | 360 | 367 | 354 |
| Durometer "A" | 89 | 90 | 90 |

The standard Ross Flexing test showed 100,000 flexes to 9/32 inch cut growth.

Example No. 7 is a soling stock that employs an aluminum resinate masterbatch having approximately 75 parts aluminum resinate to 100 parts butadiene styrene rubber (GRS) and that compares favorably with the more expensive soling stocks in elasticity, tensile strength and abrasion resistance.

In the claims the term "polymer" is used in its generic sense to include copolymers, it being understood that natural rubber is a polymer of isoprene.

It is to be understood that in accordance with the provisions of the patent statutes, variations and modifications of the specific compositions herein shown may be made without departing from the spirit of the invention.

What we claim is:

1. A rosin extended rubber composition comprising a rubbery polymer of a conjugated diolefinic compound of less than 8 aliphatic carbons compounded with a resinous extending material composed of rosin and aluminum salts of rosin acids and composed mainly of aluminum resinate and containing 20 to 200 parts of aluminum resinate per 100 parts of the polymer in the composition, the ratio of abietic groups to aluminum present in said aluminum resinate being at least two thirds the ratio of abietic groups to aluminum in aluminum diresinate.

2. A rosin extended rubber composition comprising a rubbery butadiene copolymer compounded with a resinous extending material composed of rosin and aluminum salts of rosin acids in the proportion of 50 to 200 parts of resinous extending material to 100 parts of the copolymer, the major portion of the extending material being in the form of aluminum resinate, the ratio of abietic groups to aluminum present in said aluminum resinate being at least ⅔ the ratio of abietic groups to aluminum in aluminum diresinate.

3. The method of making an aluminum resinate rubber composition which comprises dissolving 50 to 200 parts of a soluble rosin soap to 100 parts of the rubber in a latex of a rubbery polymer of a conjugated diolefinic compound of less than 8 aliphatic carbons, adjusting the hydrogen ion concentration of the latex to 10.5 to 11 pH, coagulating a predetermined amount of the latex in an aluminum sulfate solution initially adjusted to a pH between 3 and 4 and of a volume and concentration such that the pH is not increased above 4 during coagulation of said predetermined amount of latex.

4. The method of making an aluminum resinate rubber composition which comprises dissolving 50 to 200 parts of a soluble rosin soap per 100 parts of the rubber in a latex of a rubbery polymer of a conjugated diolefinic compound of less than 8 aliphatic carbons, adjusting the hydrogen ion concentration of the latex to 10.5 to 11 pH, coagulating a predetermined amount of the latex in an aluminum sulfate solution initially adjusted to a pH between 3 and 4 and of a volume and concentration such that the pH is not increased above 4 during coagulation of said predetermined amount of latex, the amount of aluminum sulfate in the solution being from ⅔ to twice the stoichiometric amount for the aluminum diresinate formed by the reaction.

(References on following page)

References Cited in the file of this patent

UNITED STATES PATENTS

| | | |
|---|---|---|
| 2,607,753 | Adams | Aug. 19, 1952 |
| 2,611,719 | Borders | Sept. 23, 1952 |
| 2,643,233 | Bennett et al. | June 23, 1953 |

OTHER REFERENCES (Hackh's Chemical Dictionary, 3rd ed., 1944, page 38. (Copy in Division 50.)

Howland et al.; Ind. & Eng. Chem., May 1953, vol. 45, No. 5, pages 1053–1059.